US008807549B2

(12) United States Patent
Henze et al.

(10) Patent No.: US 8,807,549 B2
(45) Date of Patent: Aug. 19, 2014

(54) CLAMP FOR JOINING WORK PIECES

(75) Inventors: Tom Henze, Highland Lakes, NJ (US); Daniel Patrick Banasik, Eagan, MN (US)

(73) Assignee: Rockler Companies, Inc., Medina, MN (US)

( * ) Notice: Subject to any disclaimer, the term of this patent is extended or adjusted under 35 U.S.C. 154(b) by 372 days.

(21) Appl. No.: 13/027,764

(22) Filed: Feb. 15, 2011

(65) Prior Publication Data

US 2011/0175272 A1 Jul. 21, 2011

Related U.S. Application Data

(63) Continuation-in-part of application No. 29/340,365, filed on Jul. 17, 2009, now Pat. No. Des. 651,885.

(51) Int. Cl.
*B23Q 3/00* (2006.01)

(52) U.S. Cl.
USPC .............................. 269/47; 269/149; 269/249

(58) Field of Classification Search
USPC ......... 269/47, 3, 6, 95, 228; 29/244, 270, 278
See application file for complete search history.

(56) References Cited

U.S. PATENT DOCUMENTS

| | | | | |
|---|---|---|---|---|
| 1,442,076 | A | 1/1923 | Koll | |
| 1,474,119 | A | 11/1923 | Robertson | |
| 2,636,528 | A | 4/1953 | Golnick | |
| 2,642,905 | A * | 6/1953 | Hewat | 269/93 |
| 2,991,669 | A | 7/1961 | Stock | |
| 3,872,760 | A * | 3/1975 | Desnoyers, Jr. | 83/743 |
| 4,162,785 | A | 7/1979 | Johnson | |
| D252,995 | S | 9/1979 | Tiedemann, Jr. | |
| 4,513,955 | A | 4/1985 | Daubon | |
| 5,435,533 | A * | 7/1995 | Weinmann, Jr. | 269/228 |
| 6,116,588 | A * | 9/2000 | Yamane | 269/228 |
| 6,691,993 | B2 | 2/2004 | Anton | |
| D514,914 | S | 2/2006 | Degen | |
| D515,386 | S | 2/2006 | Noniewicz et al. | |
| 555,454 | A1 | 11/2007 | Zbigniew Noniewicz | |
| D557,098 | S | 12/2007 | Noniewicz | |
| 7,387,296 | B2 | 6/2008 | Alberti | |
| 7,648,131 | B2 * | 1/2010 | Hagan et al. | 269/228 |
| 2007/0108684 | A1 * | 5/2007 | Webb | 269/228 |
| 2010/0148414 | A1 * | 6/2010 | Poole et al. | 269/228 |

OTHER PUBLICATIONS

Photographs of over-center pocket hole clamp (blue) known prior to at least Jul. 1, 2009 (nine pp. bearing nine color photographs).
Photos of "Universal" clamp, dated Jun. 29, 2009 (two pages bearing two photographs).
Screen prints of Kreg Tool Company website, showing "Right Angle Clamp" (Model No. KHC-RAC), "Face Clamps" (Model Nos. #KHC-Premium, #KFIC-Large, #KHC-XLARGE), and "90 Degree Corner Clamp" (Model No. Khc-90DCC), dated May 26, 2009 (four pages).

* cited by examiner

*Primary Examiner* — Lee D Wilson
(74) *Attorney, Agent, or Firm* — James L. Young; Westman, Champlin & Koehler, P.A.

(57) ABSTRACT

A clamp for maintaining tight physical contact between two workpieces is disclosed. Using a pocket hole in one workpiece, the clamp includes a rod or pin which engages that workpiece. The second workpiece is either maintained in position by a resilient bumper which is clamped thereon, or by a threaded screw bolt which engages the other workpiece and drives the two together between the screw bolt and pin.

14 Claims, 8 Drawing Sheets

CLAMP FOR JOINING WORK PIECES

CROSS-REFERENCE TO RELATED APPLICATIONS

This application is a continuation in part of U.S. Ser. No. 29/340,365 filed 17 Jul. 2009 now U.S. Pat. No. D651,885.

BACKGROUND OF THE INVENTION

1. Field of the Invention

The present invention is directed to the field of clamping devices, and more particularly to clamps for joining work pieces for gluing or other further assembly.

2. Background

Joining of two separate work pieces (often at right angles or end to end) requires a fastener and a hole drilled in one work piece at an angle. A common joining method is known as pocket hole joinery and, involves drilling a hole at an angle into one workpiece, and then joining it to a second workpiece with a self-tapping screw. The technique, in addition to doweling, has its roots in ancient Egypt. Egyptians clamped two workpieces together and bored a hole at an angle from the outside workpiece into the second workpiece. They then inserted a dowel with glue, and cut it off flush with the outermost surface.

Though the method of joining is old, it often necessary to clamp the workpieces together, for example, to allow glue between the pieces to set. That has been a problem because ordinary clamps are not configured to hold the workpieces together, especially without marring the work surface.

BRIEF SUMMARY OF THE INVENTION

This summary is supplied to assist the reader in understanding the remaining disclosure and does not define of the scope of the invention.

There is disclosed a clamp for maintaining workpieces in contact, one of said workpieces having an angled passage therethrough, said clamp having at least some of the of the following a. A main clamp portion having first and second ends;

b. A generally planar surface between the ends;

c. An angled pin extending through said planar surface toward one end thereof;

d. A screw bolt having a proximal end threadedly affixed to said main portion and a distal end extending toward said angled pin, thereby defining between said distal end and said pin, an adjustable space for said workpieces.

Also disclosed is a clamp wherein said angled pin extends outwardly from said planar surface at an oblique angle.

Also disclosed is a clamp wherein said angled pin includes a screw head and threaded portion for attachment and removal from the main portion of the clamp.

Also disclosed is a clamp wherein said main portion further includes an extension generally extending orthogonally from said main portion and including a threaded aperture sized to threadedly receive said bolt.

Also disclosed is a clamp wherein said bolt is generally parallel with said planar surface and offset therefrom.

Also disclosed is a clamp wherein said bolt is generally parallel with said planar surface and offset directly below said surface.

Also disclosed is a clamp for maintaining workpieces in contact, one of said workpieces having an angled pocket hole passage therethrough, said clamp comprising:

a. A main clamp portion having first and second ends;

b. A generally planar surface on said main portion extending generally between the ends;

c. A removeable angled pin extending through said planar surface and located toward one end and extending generally toward the other end thereof;

d. A threaded bolt having a proximal end threadedly engaging to said main portion and a distal end extending toward said angled pin, thereby defining between said distal end and said pin, an adjustable space for said workpieces.

Also disclosed is a clamp for maintaining workpieces in contact, one of said workpieces having an angled pocket hole passage therethrough, said clamp having at least some of the following:

a. A main clamp portion having first and second ends;

b. A generally planar surface on said main portion extending generally between the ends;

c. A removeable angled pin extending through said planar surface and located toward one end and extending generally toward the other end thereof;

d. A lever operated bumper movably attached to said main portion toward the other end thereof, said bumper movable from a first position generally even with or above said planar surface to a second position below said planar surface and generally orthogonal thereto, so that said workpieces are clamped between said bumper.

Also disclosed is a clamp wherein said bumper is resilient.

Also disclosed is a clamp wherein said lever is connected to a linkage for moving between said positions.

Also disclosed is a clamp wherein said bumper is adjustable in its position from the linkage.

Also disclosed is a clamp wherein said pin is removeable from the body.

Also disclosed is a clamp wherein said body includes a second generally planar surface orthogonal to said planar surface and wherein said two planar surfaces are in abutment.

DETAILED DESCRIPTION OF THE INVENTION

Figure 1:
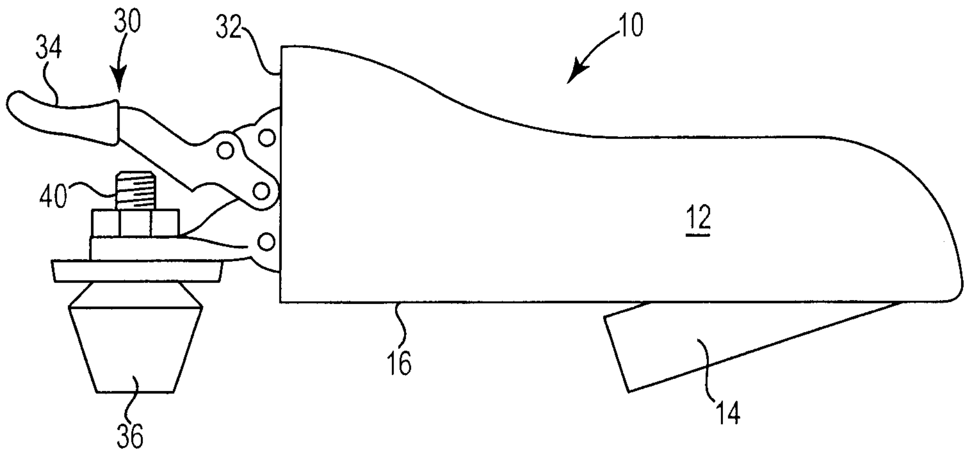
FIG. 1 illustrates a side view of a first embodiment of a clamp.

This application is a continuation in part of U.S. Ser. No. 29/340,365 filed 17 Jul. 2009 presently copending, which the disclosure is fully hereby incorporated by reference.

The disclosure is directed to two embodiments for clamping a workpiece(s) together especially when using a pocket hole style joining system. The first embodiment is shown with workpieces in FIGS. 2-4.

A clamp 10, 110 (numbering for the second embodiment will have the same number as the first embodiment except increased by 100), has a main body 12, 112 and a pocket hole projection 14, 114 extending from the base 16, 116 of the body 12, 112 and extending at an angle therefrom of approximately 15 degrees, as shown. The angle is to be selected according to that of the pre drilled pocket hole in the workpiece.

Figure 2:
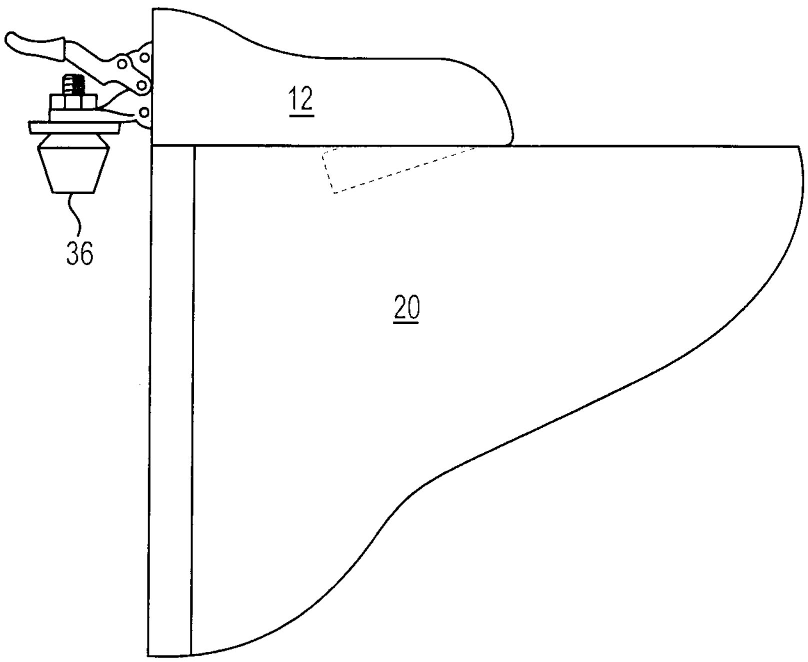
FIGS. 2 and 3 illustrate side views of the first embodiment clamp in use on workpieces, with the clamp of FIG. 2 in an open position and the clamp of FIG. 3 in a closed position.
Figure 3:
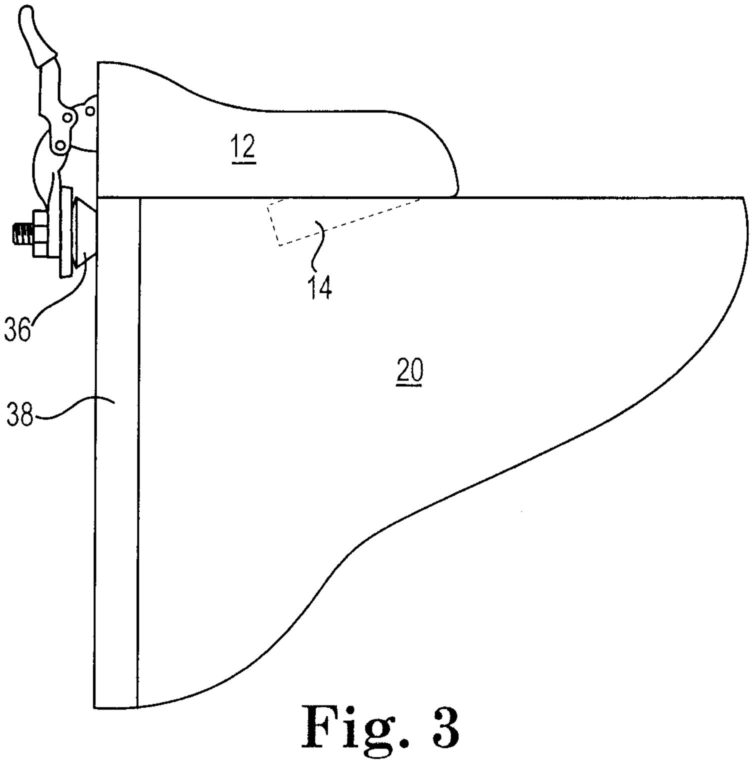
Figure 4:
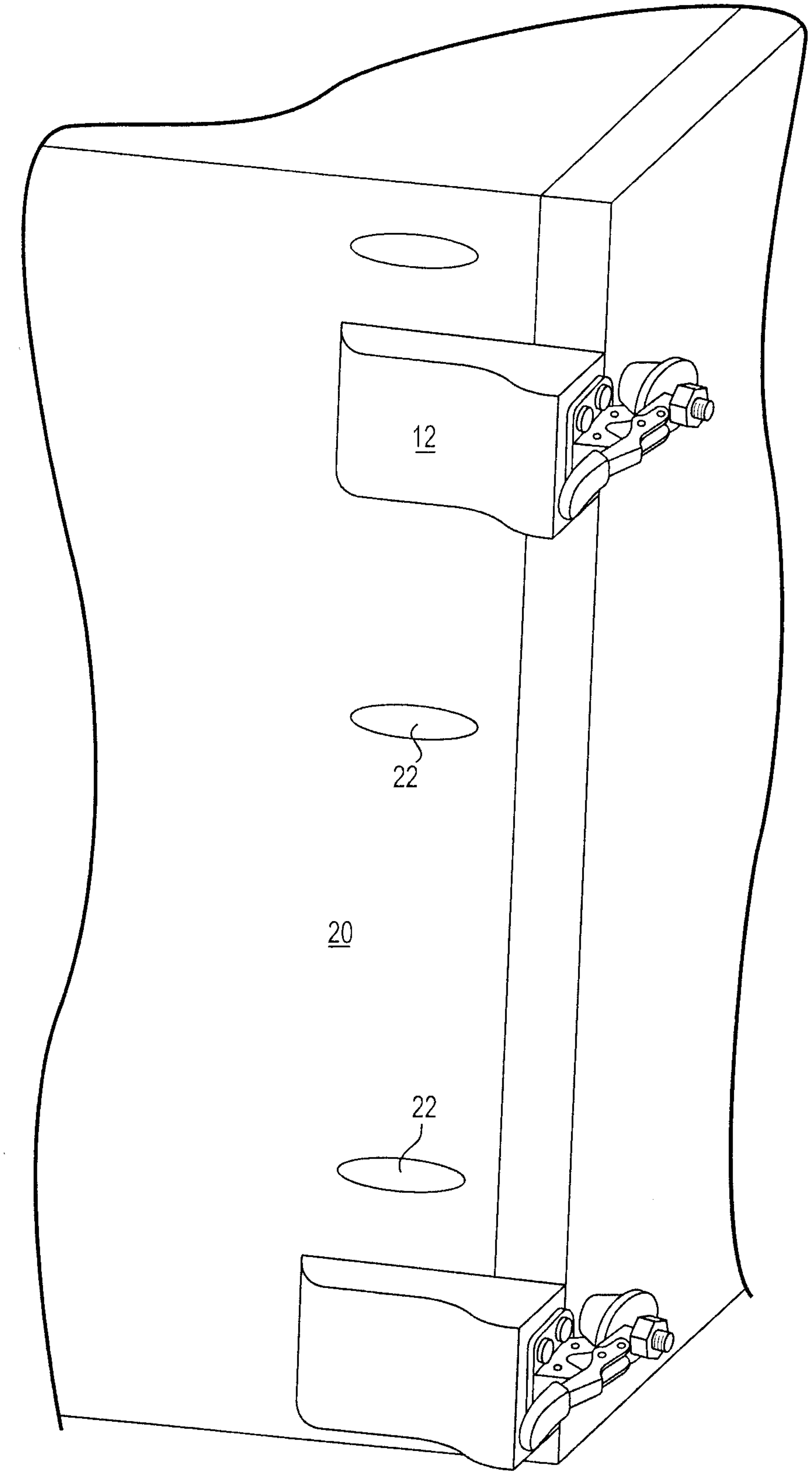
FIG. 4 illustrates the first embodiment in an environmental view.
Figure 5:
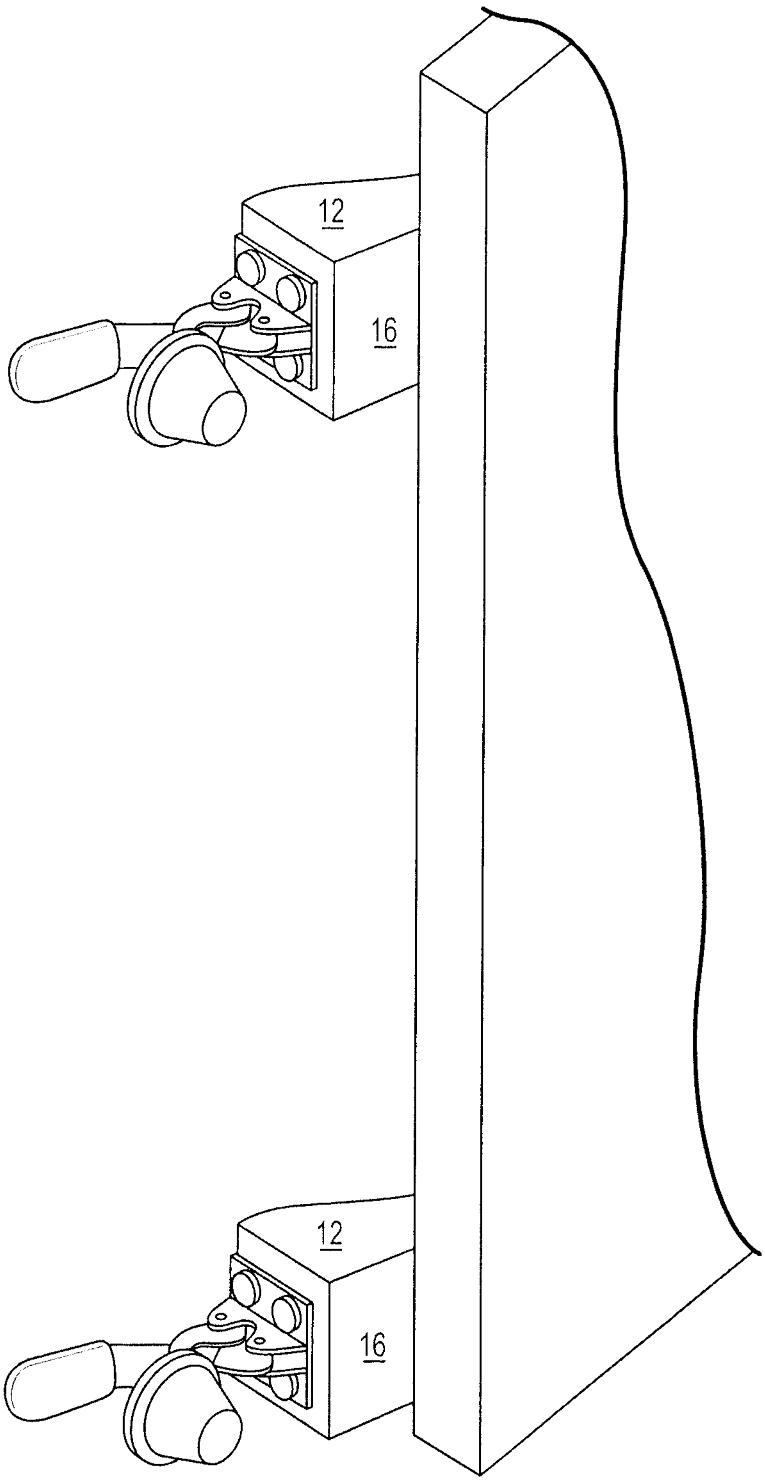
FIG. 5 illustrates the first embodiment in another environmental view.
Figure 6:
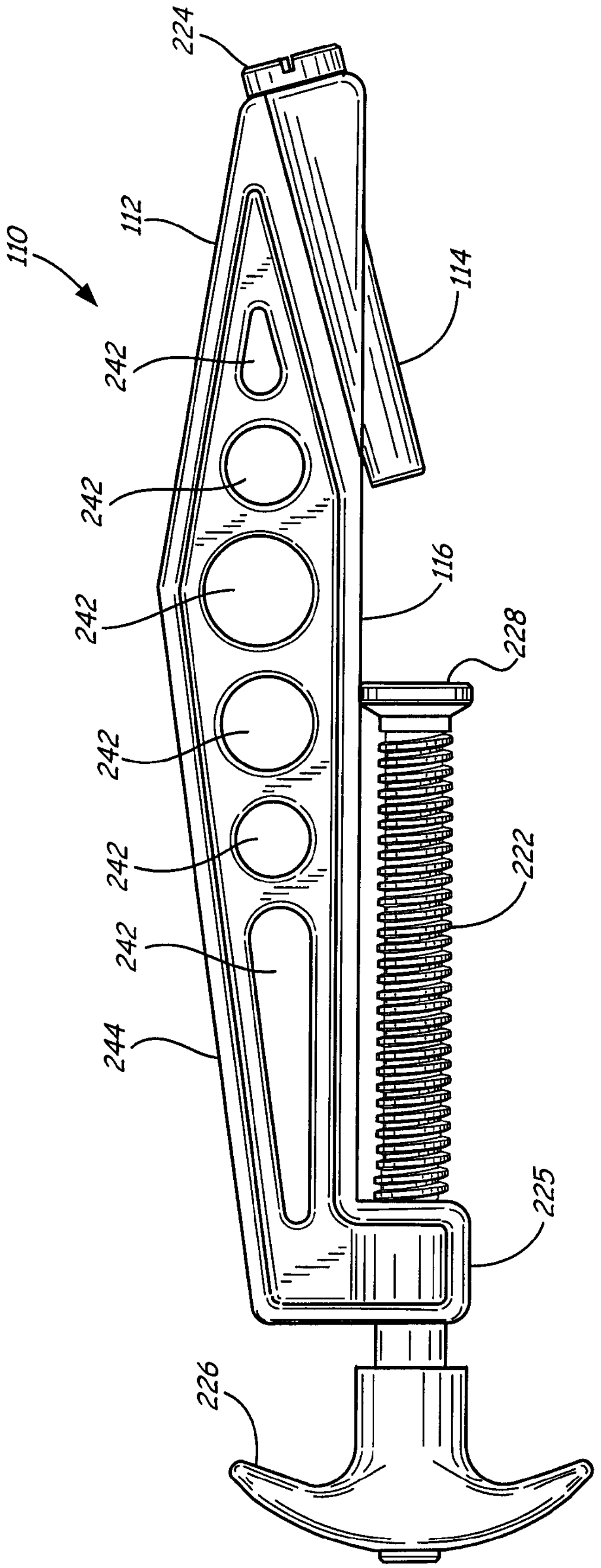
FIG. 6 is a side plan view of a second embodiment.
Figure 7:
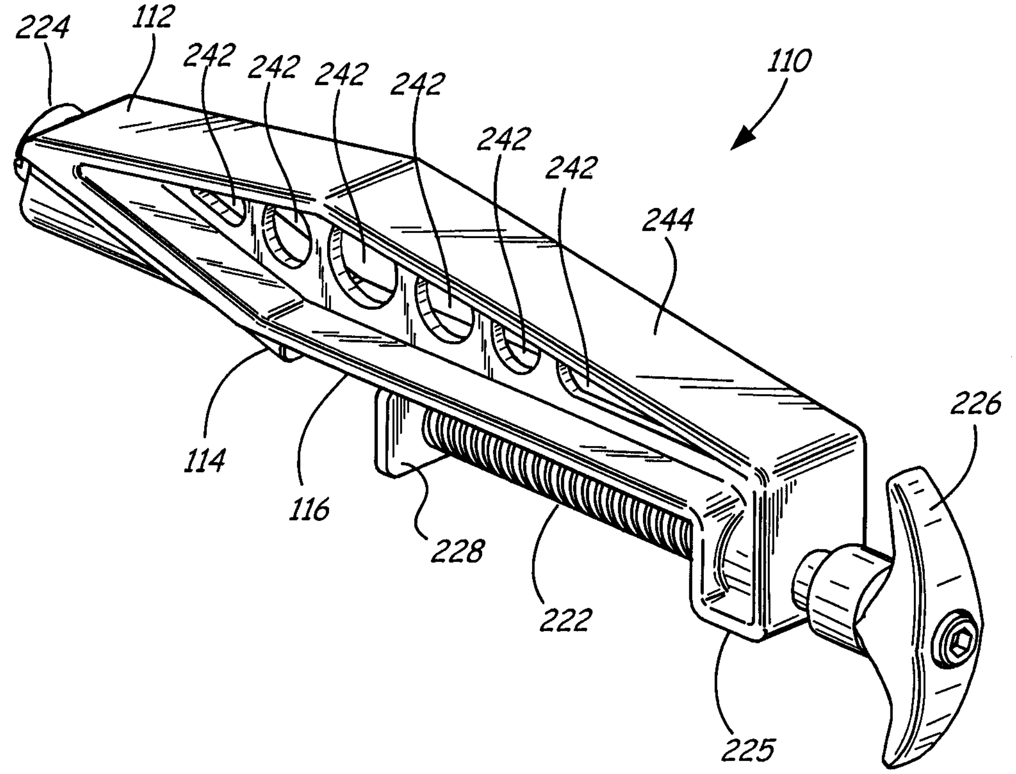
FIG. 7 is a side perspective view of the embodiment in FIG. 6.
Figure 8:
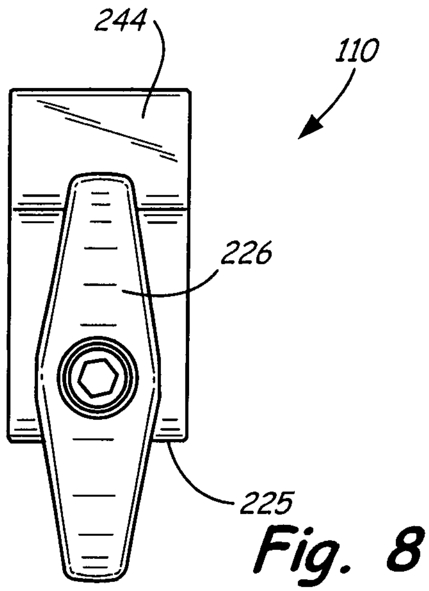
FIG. 8 is an end plan view of the embodiment in FIG. 6.
Figure 9:
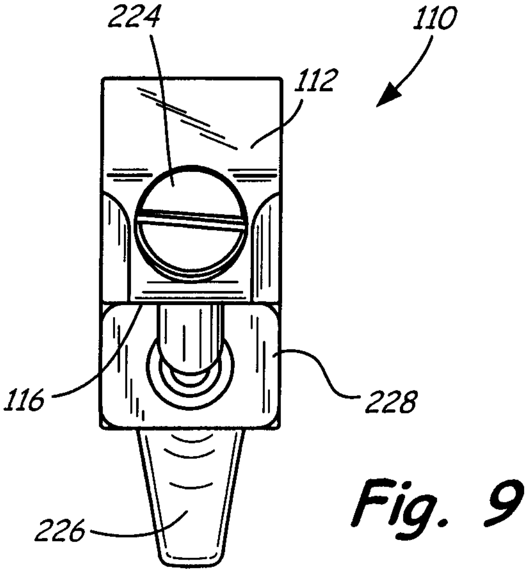
FIG. 9 is the other end plan view of the embodiment in FIG. 6.
Figure 10:
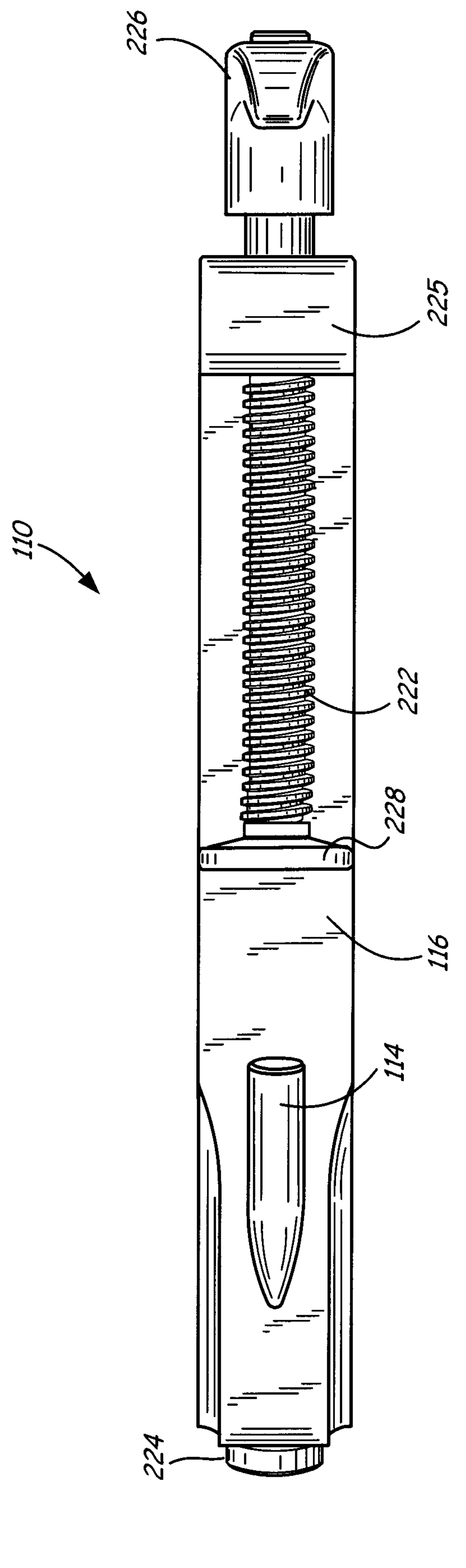
FIG. 10 is a bottom view of the embodiment in FIG. 6.

Pocket hole fastening (not clamping) is known in the art and FIGS. 3, 4 illustrate how it works. The second embodiment in FIGS. 6-10 functions similarly though it can also join two planar workpieces without being orthogonal as shown in FIG. 2-4. A hole or passage 22, 122 is drilled into one workpiece 20, 120 at an angle, such as at about 15 degrees shown in the drawings. Often a jig is used to drill the hole, so whatever angle the jig uses, the pocket hole projection/pin 14, 114 should use, though it is possible to have pin which is freely floating to adapt to whatever angle has been predrilled. This could be accomplished by moveably fixing only the proximal end of the pin on a ball mount instead of a thread mount, and allowing the distal end to vary its angle to suite a variety of angled passages.

The pocket hole projection can be a peg 14 installed into the base 16 by a like pocket hole drilled therein or, as in FIGS. 6-10 a rod 114 which is removeably inserted into an angular hole in the base 16. Screw head 224 is attached to the distal end of projection 114 and the screw head and projection are thereby removable.

The clamping action is accomplished differently in each embodiment. In FIGS. 1-5, a lever clamp 30 is affixed to a sidewall 32 of the base. Lever 34, when actuated moves, a preferably resilient adjustable bumper 36 into contact with a second workpiece 38. The frictional contact between the bumper and workpiece clamps the two workpieces 38, 20 into place. Usually the purpose of such clamping is to allow adhesive between the pieces to dry. Adhesive is often used in addition to a fastener which is screwed/nailed into the pilot hole.

The structure of lever clamp is shown as a scissors type with multi-point pivots, but other structures can be used. The bumper 36 preferably has an adjustable contact height as shown by threads 40. In its retracted position, the bumper is retracted away from the workpiece which it is intended to engage and in its engaged position it is brought into contact with such workpiece to create a compression zone between the first workpiece with the pocket hole and the second workpiece. In the preferred embodiment, the bumper is moves through approximately 90 degree angular movement from disengaged to engaged positions as show.

In FIGS. 6-10, the operation of the clamp is evident from the figures. The main body of the clamp 112 has a generally planar surface 116 out of which the pin 114 extends at one end and a screw bolt 222 is threaded from a portion 224 which extends outwardly from the base 116. Portion 225, extends from the main body, preferably orthogonally away therefrom and it is tapped and threaded to threadably/rotatably receive the bolt 222 and has a handle 226 attached thereto for driving the bolt toward the pin 114. Preferably a contact plate 228 is attached to the distal end of the bolt 222. Between contact plate 228 and pin 114 is the jaw space which contracts as the bolt is screwed closer thereto. The bolt is generally parallel with said planar surface and offset therefrom.

The bolt is generally parallel with said planar surface and offset directly below said surface, preferably below the planar surface but spaced therefrom.

The pin is removable and extends at an angle through the planar surface. The pin is located toward one end of the body and extends generally toward the other end thereof.

A threaded bolt has a proximal end threadedly engaging said main portion and a distal end extending toward said angled pin, thereby defining between said distal end and said pin, an adjustable space for said workpieces.

Holes 242 in the body of the clamp have no function have secondary meaning as a trademark and ornamentality. Likewise, the peaked ridgeline 244 of the clamp has no function but serves to create secondary meaning as a trademark and has ornamentality.

This embodiment of the clamp 110 can clamp right angle workpieces together for aligned pieces as shown for the first embodiment, but it can also clamp two planar workpieces together in abutment, where one has the pocket hole for receiving pin 114 and the other engages plate 228. The clamp of the first embodiment is preferably used to join right angle pieces as shown in FIG. 3 though it too can clamp two planar workpieces of limited dimension.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A clamp for maintaining first and second workpieces in contact, the first workpiece having an angled passage therein, the clamp comprising:

a main body comprising a generally planar surface;

an angled pin extending from the planar surface at an oblique angle and configured to fit into the angled passage; and a threaded bolt having a proximal end threadedly affixed to the main body and a distal end extending toward the angled pin, thereby defining between the distal end and the angled pin an adjustable space for the first and second workpieces.

2. The clamp of claim 1 wherein the angled pin extends outwardly from the planar surface at an angle of approximately 15 degrees.

3. The clamp of claim 1 wherein the angled pin includes a threaded portion for attachment and removal from the main body.

4. The clamp of claim 1 further comprising an extension generally extending orthogonally from the main body and including a threaded aperture sized to threadedly receive the bolt.

5. The clamp of claim 1 wherein the bolt is generally parallel with the planar surface.

6. The clamp of claim 1 wherein the bolt is offset from the planar surface.

7. A clamp for maintaining first and second workpieces in contact, the first workpiece having an angled pocket hole passage therein, the clamp comprising:

a main body comprising a generally planar surface;

removeable angled pin extending from the planar surface at an oblique angle and configured to fit into the angled pocket hole passage; and a threaded bolt having a proximal end threadedly engaged with the main body and a distal end extending toward the angled pin, thereby defining between the distal end and the angled pin an adjustable space for the first and second workpieces.

8. A clamp for maintaining first and second workpieces in contact, the first workpiece having an angled pocket hole passage therein, the clamp comprising:

a main body comprising a first generally planar surface;

an angled pin extending from the first generally planar surface at an oblique angle and configured to fit into the angled pocket hole passage;

a lever; and a bumper movable via actuation of the lever from a first position wherein the bumper does not engage the second workpiece to a second position wherein the bumper engages the second workpiece.

9. The clamp of claim 8 wherein the bumper is resilient.

10. The clamp of claim 8 wherein the lever is connected to a linkage for moving between the first and second positions.

11. The clamp of claim 10 wherein a position of the bumper with respect to the linkage is adjustable.

12. The clamp of claim 8 wherein the pin is removeable from the body.

13. The clamp of claim 10 wherein the linkage is disposed on a second generally planar surface of the body that is orthogonal to the first generally planar surface.

14. The clamp of claim 8 wherein the first position of the bumper is orthogonally offset from the second position of the bumper.

* * * * *